Sept. 25, 1951 W. D. BAILEY, JR 2,569,218
VEHICLE HOOD AND BUMPER CONSTRUCTION
Filed April 22, 1947
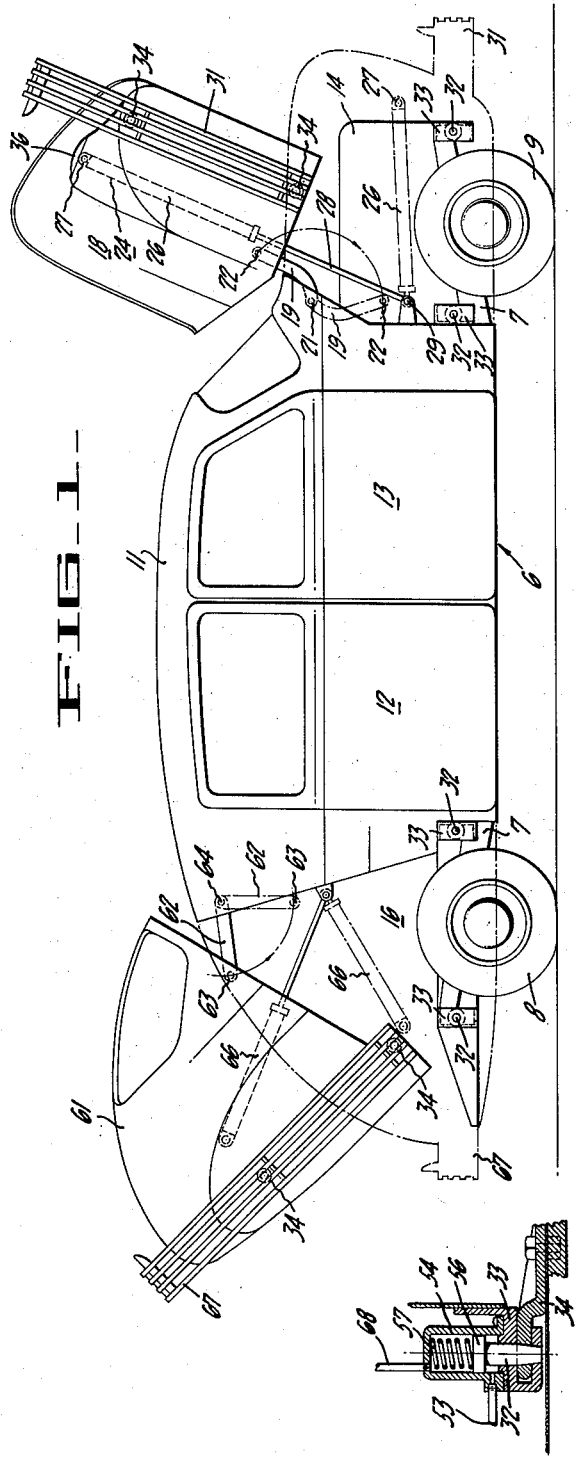
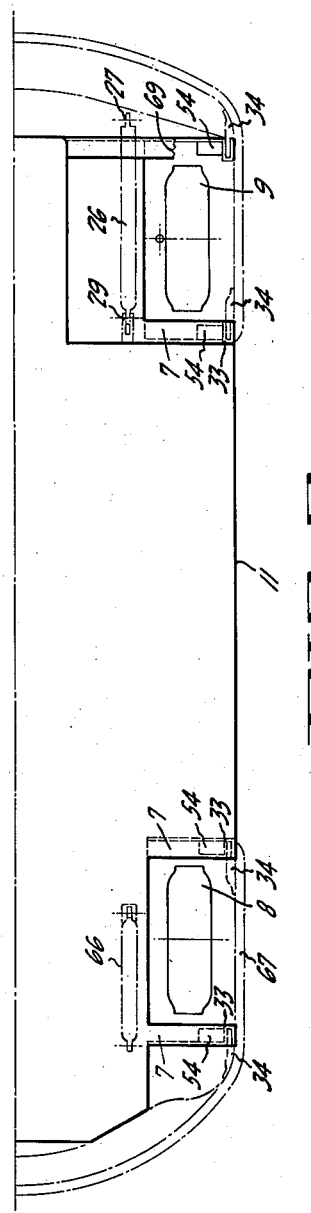
INVENTOR.
William D. Bailey Jr.

Patented Sept. 25, 1951

2,569,218

UNITED STATES PATENT OFFICE 2,569,218

VEHICLE HOOD AND BUMPER CONSTRUCTION

William D. Bailey, Jr., Oakland, Calif.

Application April 22, 1947, Serial No. 743,136

2 Claims. (Cl. 180—69)

My invention relates particularly to the construction of automotive vehicle bodies and attendant chassis portions arranged to facilitate access to normally concealed mechanisms and for establishing the movable portions of a body accurately and with considerable firmness.

While various portions of an automobile body are customarily made movable, the tendency in recent years has been to enclose certain interior mechanisms with body portions which are removable only with considerable effort if at all. Access to the concealed portions has been a matter difficult of accomplishment. One of the reasons for permanent enclosures is that movable portions are inclined to rattle, are not sufficiently firm to afford support for accessories and attendant mechanisms, and are not accurately enough positioned to warrant the installation thereon of various special structures such as lights. Nevertheless the need for ready accessibility and for firm and accurate mounting of parts has persisted.

It is, therefore, an object of my invention to provide a vehicle construction in which the exterior is of smooth lines, largely covering the wheels and shielding them with bumpers which extend around each end, and are permanently attached to the movable sections, but when locked in the closed position are rigidly attached to the chassis frame or body reinforcing.

Another object of my invention is to provide a vehicle construction in which the interior portions are unusually accessible and in which the movable portions are firmly mounted but quickly opened.

Another object of the invention is to provide a vehicle construction in which there is a locking or latching means, effective, not only firmly to secure the movable parts in position, but likewise to ensure that they are accurately positioned.

Another object of my invention is to provide a vehicle construction having certain movable portions which may be actuated by power means to relieve the operator of work, or may be counterbalanced and operated manually.

An additional object of the invention is to provide a vehicle construction in which the vehicle is divided into sections which are in effect sub-assemblies related to the main section by accurate and firm connections.

While the vehicle construction of my invention is susceptible to numerous variations in different modifications depending upon the particular vehicle, or type of vehicle, or body type which is involved, it has for example been shown herein in a representative form. In the illustration Figure 1 is a side elevation of a vehicle constructed in accordance with my invention, certain portions being drawn in dotted lines for one extreme or closed position and drawn in full lines for another extreme or open position.

Figure 2 is a plan view at approximately bumper height showing half of the vehicle construction of my invention, the omitted portion being for the most part symmetrical with that shown. The exception being that only one expansible chamber 26 and one expansible chamber 66 is necessary.

Figure 3 is a diagrammatic detail showing in cross-section one of the locking or latching mechanisms in the preferred form.

In the exemplary form illustrated, there is provided a vehicle generally designated 6, in the present instance an enclosed sedan type. The vehicle includes a frame 7 of a chassis mounted on the customary ground-engaging wheels 8 and 9. Likewise mounted on the frame is a body 11 having the usual doors 12 and 13 to afford access to the interior. Near the forward wheels 9 is situated an engine 14 effective to operate the vehicle and for auxiliary power purposes. Normally the engine is intended to be enclosed. To the rear of the main body portion is a luggage compartment 16 corresponding roughly to the compartment for the engine 14 but at the opposite end of the vehicle.

In accordance with my invention, the two ends of the vehicle 6 are very similar, one housing the engine 14 and the other the luggage compartment 16 (but should the vehicle designer require the engine to be located in the rear end, the engine and the luggage can be placed opposite to that shown), so that a description of one end applies equally to the other end with minor exceptions which will be more fully explained.

At the forward end of the body, the engine 14 is enclosed by a shell or hood 18 in contour forming substantially a continuation of the body 11 and of sufficient extent not only to encompass the engine 14 but likewise to overlie substantially all of the forward wheels 9. The shell 18 is movable with respect to the body 11 and for that reason is hinged or articulated thereto by means of interposed links 19, one at each side of the center line of the vehicle. Each link is provided with a pivot connection 21 and 22 at its opposite ends. The two links 19 are connected at pivots 21 by a cross shaft to hold the links and likewise the shell 18 in a true relative position. The shell 18 is confined approximately to a curvilinear path of motion with respect to the body. Since the links 19 are pivoted at both ends, strictly arcuate movement is not afforded the shell 18 for the reason of obtaining the desired upward position and convenience of hinge design.

Assisting in positioning the shell 18 and effective also as a means for moving the shell is a hydraulically expansible chamber 24. This comprises a cylinder 24 connected by a pivot 27 to the shell 18 and a piston rod 28 connected by a pivot 29 to the body 11. When the expansible chamber 24 is provided with suitable hydraulic fluid, it is effective to move the shell 18 from the dotted line position shown in Figure 1 into the full line position therein shown or some approximation of these positions, or may be stopped at any position between the aforesaid positions.

The shell 18 is useful not only as an enclosure for the engine 14 and wheels 9 but likewise as a mounting means for accessories. For example, an impact bumper 31 is mounted firmly on the shell 18, extends around the front of the vehicle and along both sides thereof well past the wheels 9. Since the bumper is subject to substantial impact from time to time, the hinge links 19 and the hydraulically expansible chamber 24 are not relied upon to resist the impact. Rather, means are provided for transmitting the bumper impact directly to the frame 7. For that reason pins 32 are appropriately mounted in brackets 33 on the frame 7 and project into apertured blocks 34 mounted on the interior of the shell 18 in immediate connection with the bumper 31 so that when the pins 32 are lodged within the brackets 33 and blocks 34 the bumper 31 is quite rigidly locked directly to the frame 7. All impacts upon the bumper are thus transmitted to the frame directly without imposing strains upon the shell 18, and the same locking means holds the shell 18 securely closed.

Additionally mounted on the shell 18 are headlights 36. These must be accurately positioned when the shell is lowered in order that the lights will always assume or retain their initial careful adjustment to comply with headlight laws and regulations. For that reason the pins 32 and the brackets 33 and blocks 34 are accurately made and located so that the headlights 36 are always, when in lower position, restored to precisely the same point that they were in when originally adjusted.

In order to actuate the hydraulically expansible chamber 24 and likewise the pins 32 which serve as latches or locks, I prefer a hydraulic system substantially of conventional design, which includes a fluid supply tank, and engine driven pump with an accumulator to store up energy for operation of the hydraulic system when the engine is stopped, or a pump driven by an electric motor with battery which is charged when the engine is running, pressure regulator, selector valves conveniently arranged to control the operation of the aforesaid expansible chamber 24 and pins 32 and sequence valves to control the timing of the pins 32 withdrawing and locking or the sequence valves may be designed as an integral part of the cylinders 26 and 54.

A hand hydraulic pump may be used to operate the hydraulic system separate from power control.

The method of raising or lowering the shell 18 and unlocking or locking pins 32 is by no means limited to hydraulics as some applications of this invention may require entire manual operation. The shell 18 may be counterbalanced for easy lifting and the pins 32 may be connected to a hand lever to operate all together.

In Figure 3 pin 32 is shown connected to a piston 56 and is withdrawn compressing a spring 57 when hydraulic fluid enters at 53 under pressure. Following the withdrawal of lock pins 32 the hydraulic pressure is applied to the expansible chamber 24 to lift the shell 18. When the shell 18 is again lowered into locking position the hydraulic pressure is released at 53 and pressure is applied by the spring 57 and if desired additional pressure may be applied by hydraulics at 68 to force the lock pins 32 again into locked position. In Figure 2, the frame 7 is broken away at 69 to show the connection of 54, 33, and 34.

The rear of the body 11 is provided with substantially the same mechanism in that a shell 61 is mounted on links 62 articulated by pivots 63 and 64 at its opposite ends and actuated by a hydraulically expansible chamber 66. A bumper 67 is mounted on the shell and is connected rigidly to the frame in the fashion previously described. Lights may be mounted in the shell 61. A hydraulic selector valve operates the rear shell 61 just as the one provided in connection with the front shell and by simultaneously opening both of the valves, the operator can by power raise both shells at both ends of the vehicle.

For service operations, for example, in order to change a tire, it is not necessary to remove any portion of the body structure, but merely by power to raise one or both of the shells 18 and 61. If the engine is to be serviced, it is necessary to raise merely the shell 18 while if luggage is to be stowed or withdrawn, it is necessary merely to raise the shell 61. When the shells are lowered they are locked in place virtually as firmly as though they were permanently installed.

I claim:

1. A vehicle construction comprising a frame and means supporting said frame above ground, said means including ground engaging wheels, a shell covering said wheels and adjacent portion of said frame, a bumper extending past said wheels about the outside of and affixed to said shell, hinges for articulating said shell and bumper as a unit so that said bumper is detached from said frame in the raised position, tapered pins cooperating in sockets in bumper and frame for latching securely said bumper to said frame in the covering position.

2. A vehicle construction comprising a frame and means supporting said frame above ground, said means including ground engaging wheels, a shell covering said wheels and adjacent portion of said frame, a bumper extending past said wheels about the outside of and affixed to said shell, hinges for articulating said shell and bumper as a unit so that said bumper is detached from said frame in the raised position, tapered pins cooperating in sockets in bumper and frame for latching securely said bumper to said frame in the covering position, a hydraulic cylinder linked to articulate with and to raise and lower said shell and bumper unit, said latch pins hydraulically operated, sequence valves to time the withdrawing and raising, the lowering and locking of said shell and bumper unit and said latch pins.

WILLIAM D. BAILEY, JR.

REFERENCES CITED

The following references are of record in the file of this patent:

UNITED STATES PATENTS

| Number | Name | Date |
|---|---|---|
| 2,128,930 | Fageol et al. | Sept. 6, 1939 |
| 2,175,528 | Klavik | Oct. 10, 1939 |
| 2,232,275 | Ronning | Feb. 18, 1941 |
| 2,306,348 | Spear | Dec. 22, 1942 |
| 2,329,808 | Wolfe | Sept. 21, 1943 |
| 2,349,940 | Craig | May 30, 1944 |
| 2,352,929 | Worgess | July 4, 1944 |
| 2,413,792 | Sharp | Jan. 7, 1947 |